(12) United States Patent
Takahashi et al.

(10) Patent No.: US 8,718,879 B2
(45) Date of Patent: May 6, 2014

(54) WORK VEHICLE AND METHOD FOR CONTROLLING WORK VEHICLE

(75) Inventors: Hirotaka Takahashi, Komatsu (JP); Nobuo Matsuyama, Hirakata (JP)

(73) Assignee: Komatsu Ltd., Tokyo (JP)

( * ) Notice: Subject to any disclaimer, the term of this patent is extended or adjusted under 35 U.S.C. 154(b) by 491 days.

(21) Appl. No.: 12/674,705

(22) PCT Filed: Sep. 4, 2008

(86) PCT No.: PCT/JP2008/065936
§ 371 (c)(1),
(2), (4) Date: Feb. 23, 2010

(87) PCT Pub. No.: WO2009/054190
PCT Pub. Date: Apr. 30, 2009

(65) Prior Publication Data
US 2011/0046858 A1 Feb. 24, 2011

(30) Foreign Application Priority Data

Oct. 25, 2007 (JP) ................................. 2007-277086

(51) Int. Cl.
*F16H 59/44* (2006.01)
*F16H 61/14* (2006.01)
*B60W 10/02* (2006.01)
*G06F 19/00* (2011.01)

(52) U.S. Cl.
USPC .................... 701/50; 701/51; 701/67; 477/62; 477/175; 477/176

(58) Field of Classification Search
USPC ......... 192/3.3, 3.31, 3.58; 477/107, 110, 111, 477/115, 144, 169, 172, 174, 175, 176, 38, 477/5, 50, 53, 61–65, 70, 89, 95; 701/110, 701/31.4, 31.8, 50, 51, 53, 54, 55, 57, 67, 701/68
See application file for complete search history.

(56) References Cited

U.S. PATENT DOCUMENTS 5,133,232 A * 7/1992 Kikuchi et al. ................. 477/65
5,257,193 A 10/1993 Kusaka et al.

(Continued)

FOREIGN PATENT DOCUMENTS

EP 0 445 770 A1 9/1991
EP 1 801 294 A1 6/2007

(Continued)

OTHER PUBLICATIONS

European Search Report of corresponding EP Application No. 08 84 2211.8 dated Dec. 1, 2010.

(Continued)

*Primary Examiner* — Fadey Jabr
*Assistant Examiner* — Kevin P Mahne
(74) *Attorney, Agent, or Firm* — Global IP Counselors, LLP (57) ABSTRACT

In this work vehicle, a control unit controls a shift in a speed gear of a transmission according to the vehicle velocity. The control unit determines whether or not the acceleration rate of the vehicle is equal to or less than a predetermined threshold when the vehicle velocity is within a predetermined first range. The control unit switches a lock-up clutch from a not-connected state to a connected state when the acceleration rate of the vehicle is equal to or less than the predetermined threshold. The control unit maintains the lock-up clutch in a not-connected state when the acceleration rate of the vehicle is greater than the predetermined threshold.

12 Claims, 4 Drawing Sheets

(56) References Cited

U.S. PATENT DOCUMENTS

| | | | |
|---|---|---|---|
| 5,609,547 A * | 3/1997 | Matsushita et al. | 477/110 |
| 5,616,100 A | 4/1997 | Sakai et al. | |
| 6,049,752 A * | 4/2000 | Katakura et al. | 701/68 |
| 6,152,852 A * | 11/2000 | Sakakibara et al. | 477/175 |
| 6,183,389 B1 * | 2/2001 | Tabata | 477/5 |
| 6,186,925 B1 * | 2/2001 | Bellinger | 477/175 |
| 6,508,739 B1 * | 1/2003 | Bellinger | 477/62 |
| 2002/0175036 A1 * | 11/2002 | Takatori et al. | 192/3.3 |
| 2004/0043863 A1 * | 3/2004 | Kondo et al. | 477/38 |
| 2005/0222737 A1 | 10/2005 | Imamura et al. | |
| 2007/0099757 A1 | 5/2007 | Landes | |
| 2007/0213175 A1 * | 9/2007 | Kuwahara et al. | 477/62 |
| 2008/0058155 A1 * | 3/2008 | Sinojima | 477/50 |
| 2008/0228363 A1 * | 9/2008 | Kouno et al. | 701/54 |

FOREIGN PATENT DOCUMENTS

| | | | |
|---|---|---|---|
| JP | 59-140960 A | 8/1984 | |
| JP | 03-30021 B2 | 4/1991 | |
| JP | 05-93429 A | 4/1993 | |
| JP | 05093429 A * | 4/1993 | E02F 3/84 |
| JP | 2007-107651 A | 4/2007 | |
| WO | WO-88/05732 | 8/1988 | |

OTHER PUBLICATIONS

Office Action of corresponding EP Application No. 08 842 211.8 dated Oct. 19, 2011.

* cited by examiner

WORK VEHICLE AND METHOD FOR CONTROLLING WORK VEHICLE

CROSS-REFERENCE TO RELATED APPLICATIONS

This national phase application claims priority to Japanese Patent Application No. 2007-277086 filed on Oct. 25, 2007. The entire disclosure of Japanese Patent Application No. 2007-277086 is hereby incorporated herein by reference.

TECHNICAL FIELD

The present invention relates to a work vehicle and a method for controlling a work vehicle.

BACKGROUND ART

Wheel loaders and other work vehicles comprise an engine, travel wheels rotatably driven by driving force from the engine, and a power transmission mechanism for transmitting the driving force from the engine to the travel wheels. The power transmission mechanism has a transmission and a torque converter with a lock-up clutch, and a control unit controls the engaging and disengaging of the lock-up clutch and the shifting of gears in the transmission. For example, in the work vehicle shown in Japanese Laid-Open Patent Application No. 2007-107651, the transmission speed gear can be shifted from a first speed gear to a fourth speed gear, and the lock-up clutch can be switched between an engaged and a not-connected state. In a conventional work vehicle, the switching of the lock-up clutch between the engaged and not-connected state is determined according to whether or not the vehicle velocity is equal to or greater than a predetermined velocity. Specifically, when the vehicle velocity has reached a predetermined velocity or greater, the lock-up clutch is engaged and the driving force from the engine is transmitted to the transmission via the lock-up clutch.

SUMMARY

However, as described above, when the switching of the lock-up clutch to a connected state is determined according to the vehicle velocity, the lock-up clutch is switched due to the vehicle velocity reaching a predetermined velocity even during a sudden acceleration. In this case, the lock-up clutch is switched regardless of the powerful acceleration that has already been achieved, which may cause that acceleration will instead be slowed.

An object of the present invention is to provide a work vehicle and a control method for a work vehicle whereby the decrease in acceleration during a sudden acceleration can be minimized.

The work vehicle according to a first aspect of the present invention includes an engine, a travel wheel, a power transmission mechanism, and a control unit. The travel wheel is rotatably driven by driving force from the engine. The power transmission mechanism has a transmission and a torque converter with a lock-up clutch, and transmits driving force from the engine to the travel wheel. The control unit controls a shift in a speed gear of the transmission according to a vehicle velocity. The control unit determines whether or not an acceleration rate of the vehicle is equal to or less than a predetermined threshold when the vehicle velocity is within a predetermined first range, and the control unit switches the lock-up clutch from a not-connected state to a connected state when the acceleration rate of the vehicle is equal to or less than the threshold. The control unit maintains the lock-up clutch in a not-connected state when the acceleration rate of the vehicle is greater than the threshold.

In this work vehicle, when the vehicle velocity is within the first range, the acceleration rate is taken into account in determining whether or not to switch the lock-up clutch from the not-connected state to a connected state. Specifically, when the acceleration rate is greater than the threshold, the lock-up clutch is not switched from a not-connected state to a connected state, and the lock-up clutch is maintained in a not-connected state. When the acceleration rate is equal to or less than the threshold, the lock-up clutch is switched to a connected state. Therefore, during a sudden acceleration, the lock-up clutch is maintained in a not-connected state, and switching of the lock-up clutch is not performed. The decrease in the acceleration rate during a sudden acceleration can thereby be minimized.

The work vehicle according to a second aspect of the present invention is the work vehicle according to the first aspect, further comprising an acceleration device configured and arranged to be operated by an operator to input a target rotational speed of the engine. The first range is determined according to an amount by which the acceleration device is operated.

In this work vehicle, the first range can be determined according to the change in driving force by establishing the first range in accordance with the amount by which the acceleration device is operated. Switching of the lock-up clutch can thereby be performed more effectively.

The work vehicle according to a third aspect of the present invention is the work vehicle according to the first or second aspect, wherein the control unit sets a lower limit of the first range to be substantially equal to a first limit velocity. The first limit velocity is defined such that, during a state in which the speed gear of the transmission remains the same, a first driving force transmitted from the power transmission mechanism to the travel wheel when the lock-up clutch is in a not-connected state and a second driving force transmitted from the power transmission mechanism to the travel wheel when the lock-up clutch is in a connected state coincide when the vehicle velocity is the first limit velocity, and the second driving force is greater than the first driving force when the vehicle velocity exceeds the first limit velocity.

In this work vehicle, when the vehicle velocity is within the first range, the driving force is greater when the transmission remains at the same speed gear and the lock-up clutch is in a connected state rather than a not-connected state. Therefore, a high driving force can be generated by having the lock-up clutch in a connected state while the vehicle velocity is in the first range.

The work vehicle according to a fourth aspect of the present invention is the work vehicle according to any of the first through third aspects, wherein the control unit sets an upper limit of the first range to be substantially equal to a second limit velocity. The second limit velocity is defined such that a first driving force transmitted from the power transmission mechanism to the travel wheel when the lock-up clutch is in a not-connected state and the transmission is in a predetermined low speed gear, and a third driving force transmitted from the power transmission mechanism to the travel wheel when the lock-up clutch is in a not-connected state and the transmission is in a high speed gear which is one step higher than the low speed gear, coincide when the vehicle velocity is the second limit velocity, and the third driving force is less than the first driving force when the vehicle velocity is less than the second limit velocity.

In this work vehicle, while the vehicle velocity is within the first range, maintaining the transmission in the low speed gear makes it possible to generate greater driving force than upshifting the transmission from the low speed gear to a high speed gear one step higher. Therefore, when the vehicle velocity is within the first range, the transmission is maintained in the low speed gear, and the lock-up clutch is switched based on the acceleration rate, whereby a higher driving force can be ensured than when the speed gear of the transmission is shifted.

The work vehicle according to a fifth aspect of the present invention is the work vehicle according to the fourth aspect, wherein the control unit upshifts the transmission from the low speed gear to the high speed gear while maintaining the lock-up clutch in a not-connected state, when the vehicle velocity exceeds the upper limit of the first range while the lock-up clutch is in an not-connected state.

In this work vehicle, when the lock-up clutch is in a not-connected state, a first driving force when the transmission is in a low speed gear and a third driving force when the transmission is in a high speed gear coincide when the vehicle velocity is the first limit velocity. Therefore, the speed gear of the transmission can be shifted while the difference in driving forces is small, by upshifting the transmission when the vehicle velocity exceeds the upper limit of the first range. The shock during a gear shift can thereby be reduced.

The work vehicle according to a sixth aspect of the present invention is the work vehicle according to the fourth or fifth aspect, wherein The control unit maintains the lock-up clutch in a connected state while the vehicle velocity is in a second range which continues from a high speed side of the first range, when the vehicle velocity exceeds the upper limit of the first range while the lock-up clutch is in a connected state. The control unit also switches the lock-up clutch to a not-connected state and upshifts the transmission from the low speed gear to the high speed gear, when the vehicle velocity exceeds an upper limit of the second range which is substantially equal to the third limit velocity. The third limit velocity is defined such that the third driving force and a second driving force transmitted from the power transmission mechanism to the travel wheel when the lock-up clutch is in the connected state and the transmission is in the low speed gear coincide when the vehicle velocity is the third limit velocity.

In this work vehicle, switching of the lock-up clutch and upshifting of the transmission are performed when the vehicle velocity exceeds the upper limit of the second range, at which the difference between the second driving force and the third driving force is small. Therefore, shock that accompanies switching of the lock-up clutch and upshifting of the transmission can be reduced.

The control method for a work vehicle according to a seventh aspect of the present invention is a control method for a work vehicle comprising an engine, a travel wheel rotatably driven by driving force from the engine, and a power transmission mechanism for transmitting the driving force from the engine to the travel wheel, the power transmission mechanism having a transmission and a torque converter with a lock-up clutch. The control method includes: controlling a shift in a speed gear of the transmission according to the vehicle velocity; determining whether or not an acceleration rate of the vehicle is equal to or less than a predetermined threshold when the vehicle velocity is within a predetermined first range; switching the lock-up clutch from a not-connected state to a connected state when the acceleration rate of the vehicle is equal to or less than the threshold; and maintaining the lock-up clutch in a not-connected state when the acceleration rate of the vehicle is greater than the threshold.

In this control method for a work vehicle, when the vehicle velocity is within the first range, the acceleration rate is taken into account in determining to switch the lock-up clutch from a not-connected state to a connected state. Specifically, when the acceleration rate is greater than the threshold, the lock-up clutch is not switched from a not-connected state to a connected state, and the lock-up clutch is maintained in a not-connected state. When the acceleration rate is equal to or less than the threshold, the lock-up clutch is switched to a connected state. Therefore, the lock-up clutch is maintained in a not-connected state during sudden accelerations, and switching of the lock-up clutch is not performed. The decrease in the acceleration rate during sudden accelerations can thereby be minimized.

DESCRIPTION OF EMBODIMENTS
CONFIGURATION

Figure 1:
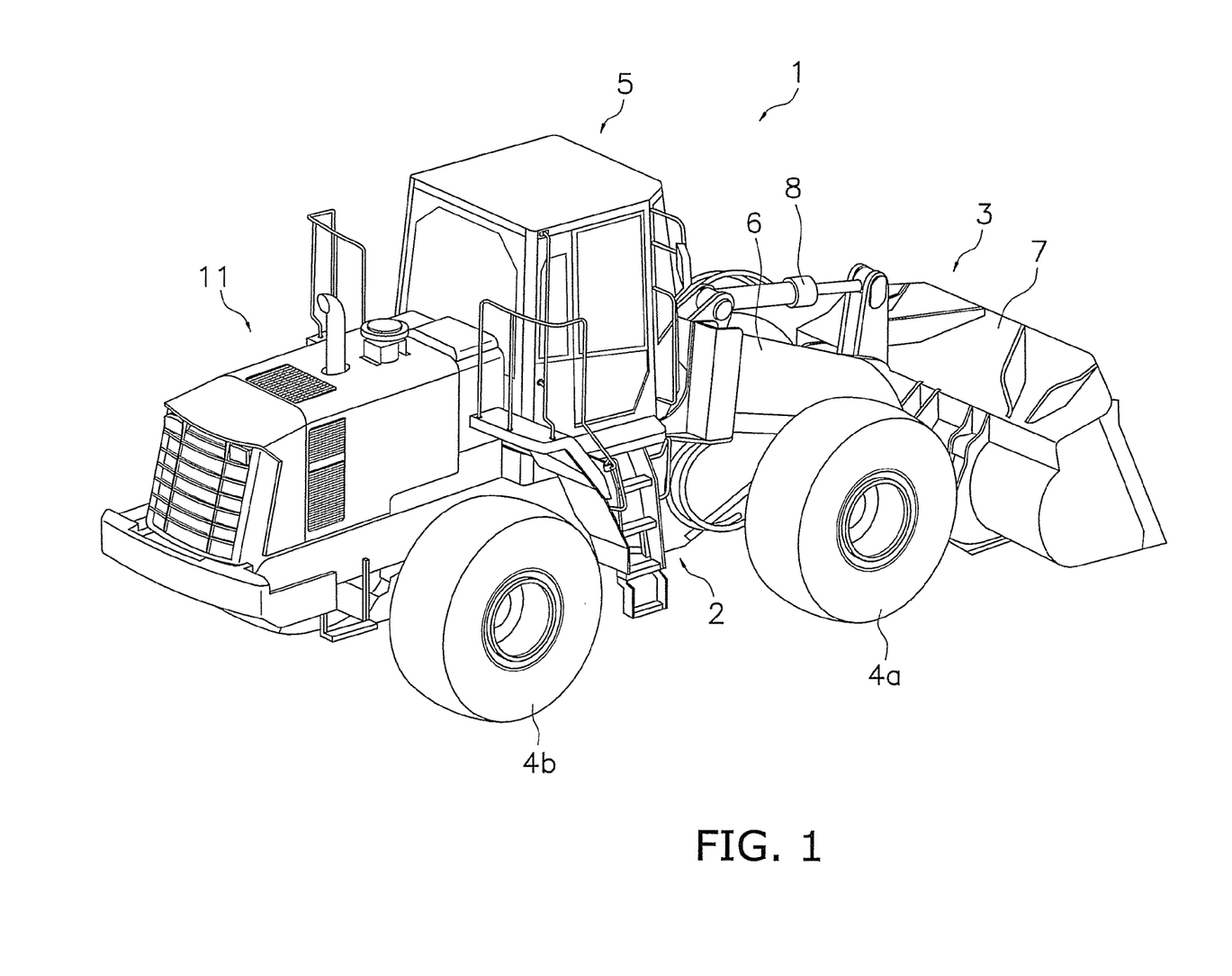
FIG. 1 is an external view of a work vehicle.
Figure 2:
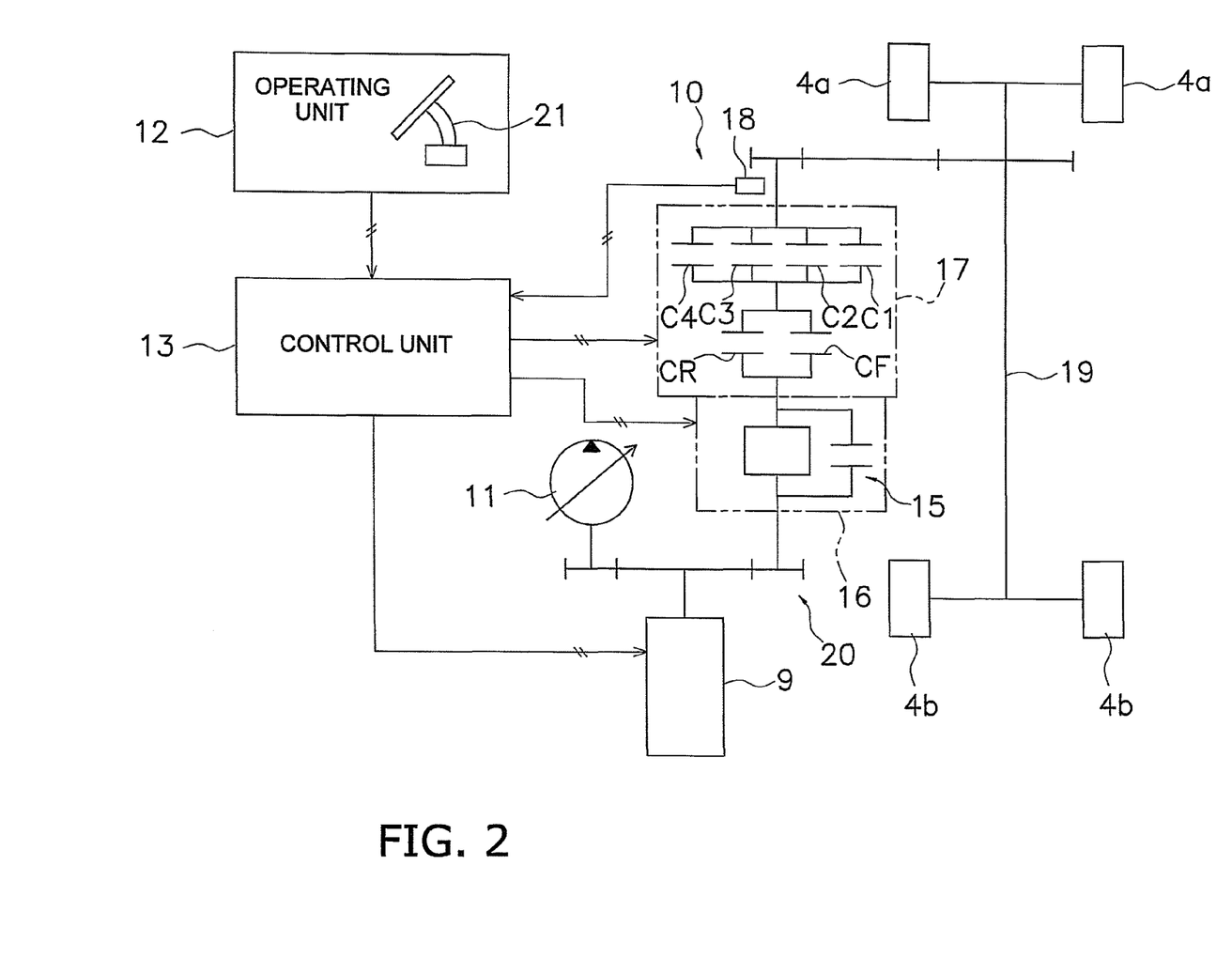
FIG. 2 is a schematic drawing showing the internal configuration of the work vehicle.

A work vehicle 1 according to an embodiment of the present invention is shown in FIGS. 1 and 2. FIG. 1 is an external view of the work vehicle 1, and FIG. 2 is a schematic drawing showing the internal configuration of the work vehicle 1. This work vehicle 1 is a wheel loader, capable of self-propulsion by rotatably driving of tires 4a, 4b and also capable of performing desired work with the use of a work implement 3.

External Configuration of Work Vehicle 1

The work vehicle 1 comprises a vehicle frame 2, a work implement 3, tires 4a, 4b, and an operator's cab 5, as shown in FIG. 1.

The work implement 3 and a pair of front tires 4a are attached to the front portion of the vehicle frame 2. The work implement 3 is a device driven by pressure oil from a hydraulic pump 11 (see FIG. 2), and the work implement 3 has a lift arm 6 mounted on the front portion of the vehicle frame 2, a bucket 7 attached to the distal end of the lift arm 6, and a work implement cylinder 8 for driving these components.

The operator's cab 5, a pair of rear tires 4b, and other components are provided to the rear portion of the vehicle frame 2. The operator's cab 5 is mounted at the upper portion of the vehicle frame 2, and installed in the operator's cab 5 are a seat on which an operator sits, an operating unit 12 described hereinafter, and other components.

Internal Configuration of Work Vehicle 1

The work vehicle 1 also comprises an engine 9, a power transmission mechanism 10, the hydraulic pump 11, the operating unit 12, a control unit 13, and other components, as shown in FIG. 2.

The engine 9 is a diesel engine, and the output thereof is controlled by adjusting the amount of fuel injected into the cylinder. This adjustment is performed by controlling a governor provided to the fuel injection pump of the engine 9. An all speed governor is commonly used as the governor, and the engine rotational speed and amount of fuel injected are adjusted according to the load so as to reach a target rotational speed corresponding to the throttle amount. Specifically, the governor increases and reduces the amount of fuel injected so as to eliminate the deviation between the target rotational speed and the actual engine rotational speed.

The power transmission mechanism 10 has a transmission 17 and a torque converter 16 with a lock-up clutch 15, and transmits driving force from the engine 9 to the tires 4a, 4b as travel wheels.

The torque converter 16 transmits the driving force from the engine 9 via oil when the lock-up clutch 15 is in a not-connected state. The lock-up clutch 15 is capable of switching between a connected state and a not-connected state, and the input side and output side of the torque converter 16 are engaged in the connected state. The lock-up clutch 15 is a hydraulically-actuated clutch, and can be switched between a connected state and a not-connected state by the supply of pressure oil to the lock-up clutch 15 being controlled by the control unit 13.

The transmission 17 has a forward clutch CF corresponding to forward traveling gears and a reverse clutch CR corresponding to reverse traveling gears, and switches between forward and reverse traveling by switching between the engaged and not-connected states of the clutches CF, CR. The transmission 17 also has a plurality of speed gear clutches C1 to C4 corresponding to a plurality of speed gears, and can switch the reduction ratio among a plurality of levels. With this transmission 17, the speed gear can be shifted among four speed gears from a first speed gear to a fourth speed gear, and the four speed gear clutches C1 to C4 are provided according to the speed gears. The speed gear clutches C1 to C4 are hydraulically actuated hydraulic clutches and are capable of being switched between engaged and not-connected states by the supply of pressure oil to the clutches C1 to C4 being controlled by the control unit 13. The output shaft of the transmission 17 is provided with a vehicle velocity sensor 18 for detecting the rotational speed of the output shaft of the transmission 17. A detection signal from the vehicle velocity sensor 18 is inputted to the control unit 13.

The driving force outputted from the transmission 17 is transmitted to the tires 4a, 4b via a propeller shaft 19 and other components.

In this work vehicle 1, some of the output of the engine 9 is transmitted to the tires 4a, 4b via the torque converter 16, the transmission 17, and other components. The rest of the output of the engine 9 is transmitted to the hydraulic pump 11 via a PTO shaft 20. The hydraulic pump 11 is thereby driven, and the pressure oil discharged from the hydraulic pump 11 is transmitted to a hydraulic actuator via an operating valve (not shown). The hydraulic actuator is the work implement cylinder 8 described above, for example, whereby the work implement 3 is operated.

The operating unit 12 is operated by an operator, and the operating unit 12 has an acceleration pedal 21 as an acceleration device for the operator to prescribe a target rotational speed of the engine 9. The acceleration pedal 21 is pressed by the operator, and a throttle signal corresponding to the amount by which the acceleration pedal 21 is pressed is inputted to the control unit 13. Though not shown in FIG. 2, the operating unit 12 also has implement-operating members other than the acceleration pedal 21 for steering, braking, and operating the work implement 3, as well as forward-reverse switching members for switching between forward and reverse travel, and other components. The operation specifics of these components are sent as operation signals to the control unit 13.

The control unit 13 controls the actions of the various components described above according to signals from the operating unit 12, the vehicle velocity sensor 18, and other sensors. For example, the control unit 13 outputs to the governor a command signal corresponding to the throttle signal inputted from the acceleration pedal 21, and controls the engine 9 so that a target rotational speed corresponding to the throttle signal is obtained. The control unit 13 controls the transmission 17 and the torque converter 16 in accordance with the traveling state of the vehicle, and can automatically perform shifting of the speed gear of the transmission 17 and switching of the lock-up clutch 15. The automatic gear-shift control by the control unit 13 is described in detail herein below.

Automatic Gear-Shift Control by Control Unit 13

Figure 3:
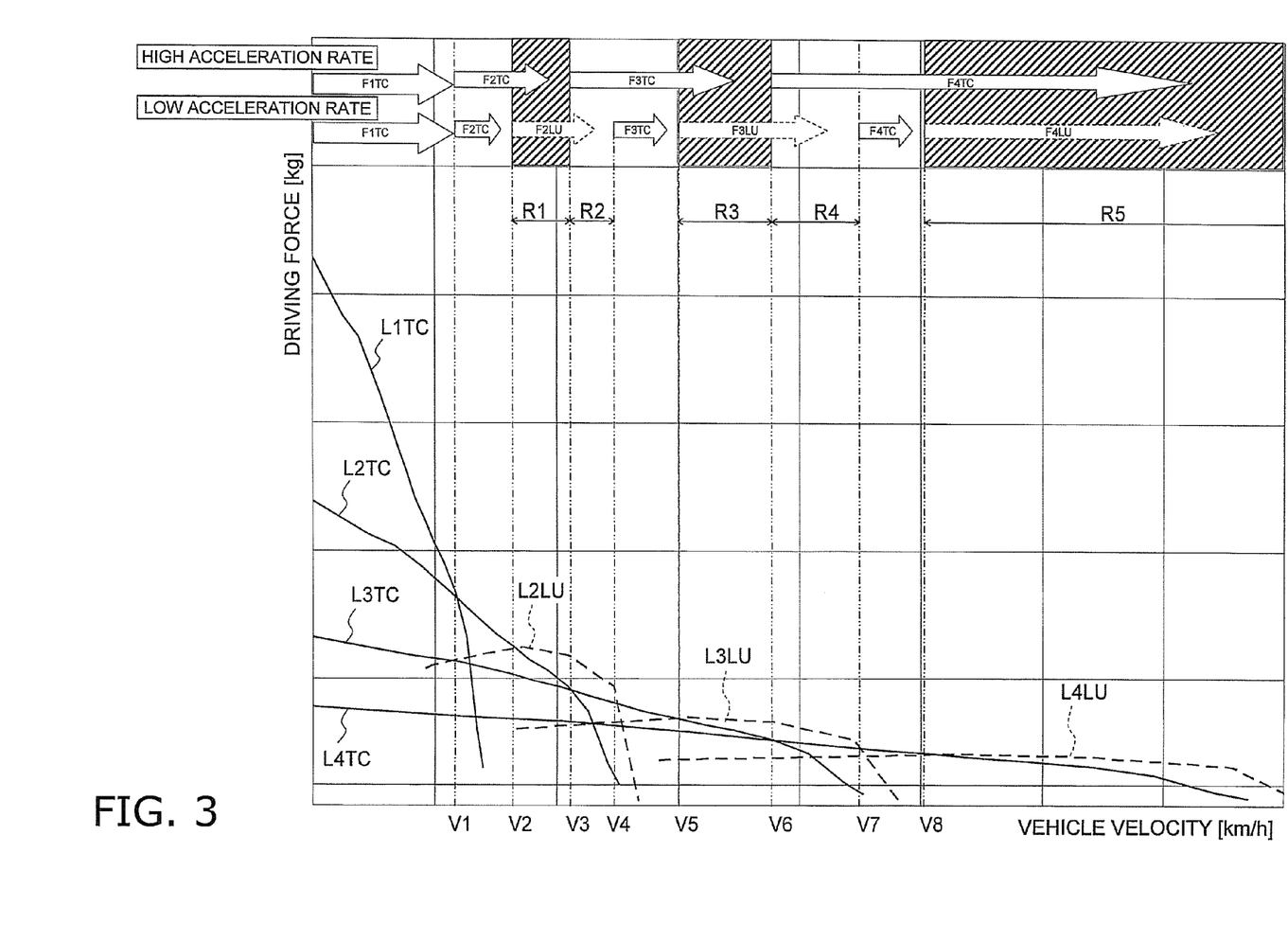
FIG. 3 is a graph showing automatic gear-shift control during upshifting.

FIG. 3 shows the shift in speed gears of the work vehicle 1 during upshifting, and driving force-vehicle velocity characteristic curves L1TC to L4TC and L2LU to L4LU in the speed gears.

In FIG. 3, the arrows displayed in white, such as "F2TC" and "F2LU," indicate a shift in the speed gear. The inclusion of "F" in these displays indicates that the transmission 17 is in a forward-travel state. The inclusion of "TC" indicates a state in which the lock-up clutch 15 is disengaged and the driving force is transmitted by the oil of the torque converter 16. The inclusion of "LU" indicates a state in which the lock-up clutch 15 is engaged and the input and output sides of the torque converter 16 are coupled by the lock-up clutch 15. The numerals included in these displays indicate that speed gears of the transmission 17 corresponding to the numerals have been selected. For example, for "F1TC," the speed gear of the transmission 17 is the first speed gear.

In the graph showing the driving force-vehicle velocity characteristic curves L1TC to L4TC and L2LU to L4LU of FIG. 3, the vertical axis represents driving force, and the horizontal axis represents vehicle velocity. The driving force discussed herein refers to the driving force transmitted from the power transmission mechanism 10 to the tires 4a, 4b. In FIG. 3, the curve denoted by the alphanumeric symbol "L1TC" represents a driving force-vehicle velocity characteristic curve when the speed gear of the work vehicle 1 is "F1TC." Similarly, the curves "L2TC", "L3TC", and "L4TC" represent driving force-vehicle velocity characteristic curves when the vehicle velocity of the work vehicle 1 is "F2TC", "F3TC", and "F4TC", respectively. The curves "L2LU", "L3LU", and "L4LU" represent driving force-vehicle velocity characteristic curves when the speed gear of the work vehicle 1 is "F2LU", "F3LU", and "F4LU", respectively.

In this work vehicle 1, the control unit 13 controls the shift in speed gear in accordance with the vehicle velocity, but when the vehicle velocity is within a predetermined range (the first range R1, the third range R3, or the fifth range R5 in FIG. 3), the decision to switch the lock-up clutch 15 is made with consideration for not only the vehicle velocity but the acceleration rate of the vehicle as well.

Figure 4:
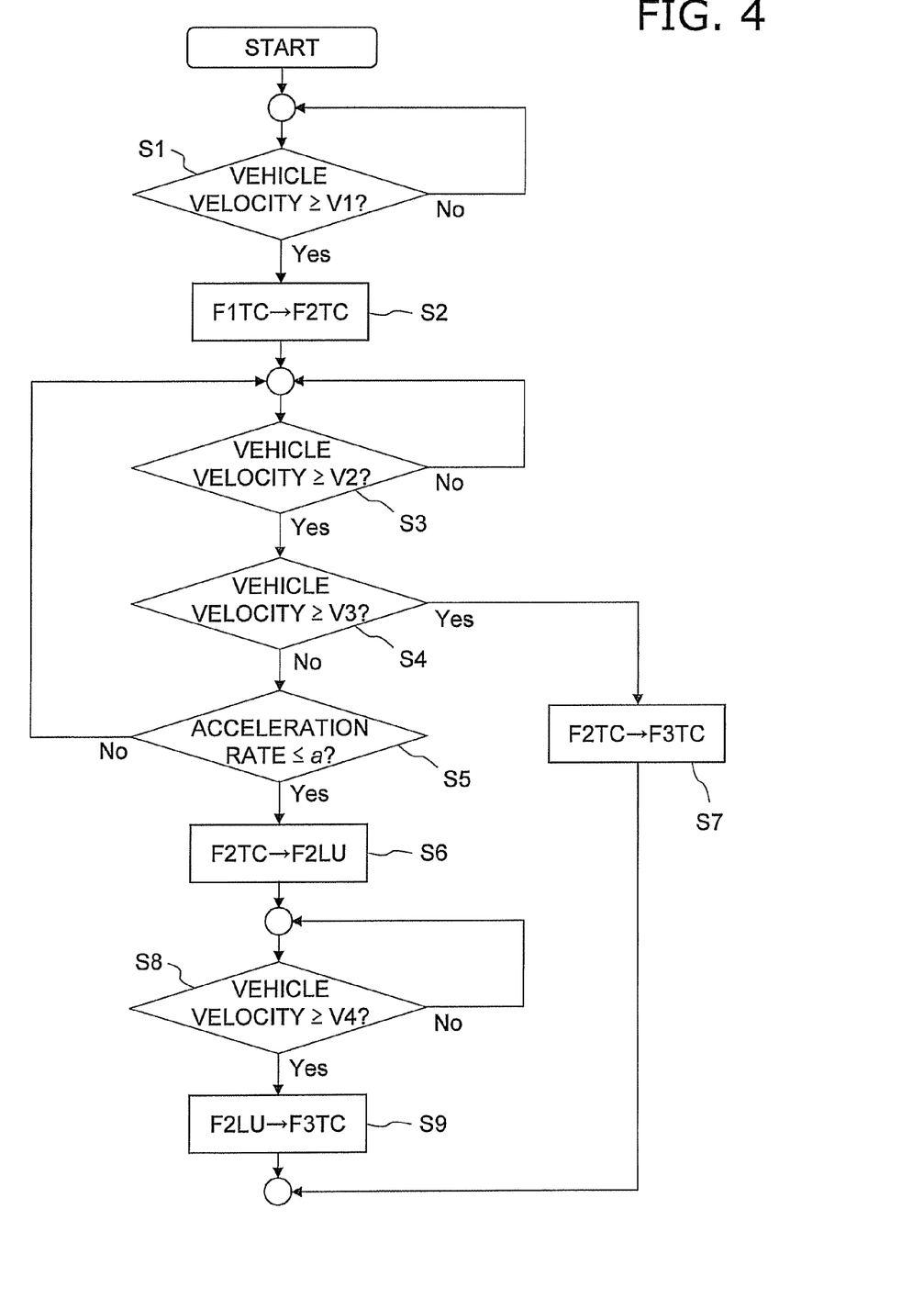
FIG. 4 is part of the control flow during upshifting.

First, when the work vehicle 1 begins moving from a vehicle velocity of zero, the speed gear of the work vehicle 1 is "F1TC." FIG. 4 shows the control flow of a case of upshifting from the speed gear "F1TC." A determination is made here as to whether or not the vehicle velocity has reached a first velocity V1 (first step S1). When the vehicle velocity reaches the first velocity V1, the speed gear is upshifted from "F1TC" to "F2TC," regardless of the acceleration rate (second step S2). The speed gear is maintained at "F1TC" until the vehicle velocity reaches the first velocity V1. The first velocity V1 is a velocity at which the driving force when the speed gear of the work vehicle 1 is "F1TC" and the driving force when the speed gear is "F2TC" coincide. The control unit 13 calculates the vehicle velocity by the following Numerical Formula (1), from the inputted rotational speed of the output shaft of the transmission 17.

$$V(n)=N(n) \times A/1000 \qquad (1)$$

V(n) is the vehicle velocity, N(n) is the rotational speed of the output shaft, and A is a predetermined constant calculated from the gear ratio.

Next, when the vehicle velocity is between the first velocity V1 and a second velocity V2, the speed gear of the work vehicle 1 is maintained at "F2TC," as shown in FIG. 3. While the vehicle velocity is within a first range R1 between the second velocity V2 and a third velocity V3, a determination is constantly being made as to whether or not a judgment condition of the acceleration rate being equal to or less than a threshold a is met (third step S3 through fifth step S5 in FIG. 4). When this judgment condition is satisfied; i.e., when the acceleration rate is equal to or less than the threshold a, the lock-up clutch 15 is switched to a connected state and the speed gear is shifted from "F2TC" to "F2LU" (sixth step S6 in FIG. 4) at the point in time when the judgment condition is satisfied. When the judgment condition is not satisfied, i.e., when the acceleration rate is greater than the threshold a, the lock-up clutch 15 is not switched to a connected state, and the speed gear is maintained at "F2TC." The second velocity V2 (first limit velocity) is a velocity at which the driving force (first driving force) when the speed gear is "F2TC" and the driving force (second driving force) when the speed gear is "F2LU" coincide, as shown in FIG. 3. The third velocity V3 (second limit velocity) is a velocity at which the driving force (first driving force) when the speed gear is "F2TC" and the driving force (third driving force) when the speed gear is "F3TC" coincide. The control unit 13 calculates the acceleration rate by the following Numerical Formula (2).

$$\alpha(n) = \frac{T \times \alpha(n-1) + V(n) - V(n-1)}{T + \Delta t} \qquad (2)$$

In this formula, a(n) is the acceleration rate, Δt is the sampling time, and T is a time constant.

When the speed gear is shifted from "F2TC" to "F2LU" as described above, the speed gear is thereafter maintained at "F2LU" without returning to "F2TC" while the vehicle velocity is within the aforementioned first range R1, even if the acceleration rate exceeds the threshold again.

When the vehicle velocity reaches the upper limit of the first range R1, i.e., the third velocity V3, while the speed gear is "F2TC," the speed gear is shifted from "F2TC" to "F3TC" (seventh step S7 in FIG. 4). Specifically, only upshifting of the transmission 17 is performed, without performing switching of the lock-up clutch 15.

When the vehicle velocity exceeds the upper limit of the first range R1 while the speed gear is "F2LU," the speed gear is maintained at "F2LU" until the vehicle velocity reaches a fourth velocity V4 (see the eighth step S8 in FIG. 4). When the vehicle velocity reaches the fourth velocity V4, the speed gear is upshifted from "F2LU" to "F3TC" (the ninth step S9 in FIG. 4). The fourth velocity V4 (third limit velocity) is a velocity at which the driving force when the speed gear is "F2LU" and the driving force when the speed gear is "F3TC" coincide, as shown in FIG. 3.

When the speed gear is "F3TC," the speed gear is maintained at "F3TC" until the vehicle velocity reaches a fifth velocity V5. The control flow during the upshifting when the speed gear is equal to or greater than "F3TC" is identical to FIG. 4 and is therefore omitted. When the vehicle velocity increases and exceeds the fifth velocity V5, the acceleration rate is constantly being determined in the same manner as described above while the vehicle velocity is within a third range R3 between the fifth velocity V5 and a sixth velocity V6. Specifically, when the aforementioned judgment condition is satisfied, the lock-up clutch 15 is switched to a connected state and the speed gear is shifted from "F3TC" to "F3LU" at the point in time when the judgment condition is satisfied. When the judgment condition is not satisfied, the lock-up clutch 15 is not switched to a connected state, and the speed gear is maintained at "F3TC." The fifth velocity V5 (first limit velocity) is a velocity at which the driving force when the speed gear is "F3TC" and the driving force when the speed gear is "F3LU" coincide. The sixth velocity V6 (second limit velocity) is a velocity at which the driving force when the speed gear is "F3TC" and the driving force when the speed gear is "F4TC" coincide.

When the vehicle velocity exceeds the upper limit of the third range R3, i.e., the sixth velocity V6, while the speed gear is "F3TC," the speed gear is shifted from "F3TC" to "F4TC." When the vehicle velocity exceeds the upper limit of the third range R3 while the speed gear is "F3LU," the speed gear is maintained at "F3LU" until the vehicle velocity reaches a seventh velocity V7. The speed gear is upshifted from "F3LU" to "F4TC" when the vehicle velocity has reached the seventh velocity V7. The seventh velocity V7 (third limit velocity) is a velocity at which the driving force when the speed gear is "F3LU" and the driving force when the speed gear is "F4TC" coincide.

When the speed gear is "F4TC," the speed gear is maintained at "F4TC" until the vehicle velocity reaches an eighth velocity V8. When the vehicle velocity increases and exceeds the eighth velocity V8, the acceleration rate is constantly being determined in the same manner as described above while the vehicle velocity is within a fifth range R5 equal to or greater than the eighth velocity V8. When the aforementioned judgment condition is satisfied, the lock-up clutch 15 is switched to a connected state and the speed gear is shifted from "F4TC" to "F4LU" at the point in time when the judgment condition is satisfied. When the judgment condition has not been satisfied, the lock-up clutch 15 is not switched to the connected state, and the speed gear is maintained at "F4TC." The eighth velocity V8 (first limit velocity) is a velocity at which the driving force when the speed gear is "F4TC" and the driving force when the speed gear is "F4LU" coincide.

In FIG. 3, the first range R1, the third range R3, and the fifth range R5 represent ranges set to cases in which the acceleration operation amount is at a maximum, and a first range R1, a third range R3, and a fifth range R5 different from those in FIG. 3 are set for cases in which the acceleration operation amount is not at a maximum. Specifically, if the acceleration operation amount is different, the driving force-vehicle velocity characteristic curve will also be different, and the speed gear at which the driving forces in the respective speed gears coincide will therefore be different. Therefore, the first range R1, the third range R3, and the fifth range R5 are established according to the change in the velocity at which the driving forces in the respective speed gears coincide; i.e., according to the acceleration operation amount.

The automatic gear-shift control described above is the control during upshifting, and different control from that described above is performed during downshifting.

Characteristics

In this work vehicle 1, the acceleration rate is taken into account in determining the switching of the lock-up clutch 15 from a not-connected state to a connected state, when the vehicle velocity is within the first range R1, the third range R3, or the fifth range R5. In other words, when the acceleration rate is greater than the threshold a, the lock-up clutch 15 is not switched from a not-connected state to a connected state, and the lock-up clutch 15 is maintained in the not-connected state. When the acceleration rate is equal to or less than the threshold a, the lock-up clutch 15 is switched to a connected state. Therefore, during a sudden acceleration, the lock-up clutch 15 is not switched, and the decrease in acceleration rate is minimized. The lock-up clutch 15 is also engaged when the acceleration rate is low, whereby the lock-up clutch 15 can be actuated in a traveling state suited to actuating (engaging) the lock-up clutch 15, such as a case of traveling at a constant velocity or a case in which a large amount of driving force is required for climbing.

The first range R1, the third range R3, and the fifth range R5 are vehicle velocity ranges in which the driving force when the lock-up clutch 15 is engaged (refer to the driving force-vehicle velocity characteristic curves L2LU, L3LU, and L4LU) is greater than the driving force when the lock-up clutch 15 is disengaged (refer to the driving force-vehicle velocity characteristic curves L1TC to L4TC). Therefore, high driving force can be generated by switching the lock-up clutch 15 from a not-connected state to a connected state in the first range R1, the third range R3, and the fifth range R5.

In cases in which the lock-up clutch 15 is in a not-connected state, the speed gear of the transmission 17 is shifted to a higher speed when the vehicle velocity exceeds the third velocity V3 or the sixth velocity V6. In cases in which the lock-up clutch 15 is in a connected state, however, a gear shift is not immediately performed even if the vehicle velocity exceeds the third velocity V3 or the sixth velocity V6, and both switching of the lock-up clutch 15 to a connected state and shifting of the speed gear of the transmission 17 to a higher speed are performed when the vehicle velocity exceeds the fourth velocity V4 or the seventh velocity V7. A gear shift can thereby be performed in a state in which there is the difference in driving force before and after the gear shift is small, and the shock of the gear shift can be reduced.

Other Embodiments (a) In the embodiment described above, a wheel loader is used as an example of a work vehicle, but the present invention can also be applied to other work vehicles.

(b) Calculating the vehicle velocity and the acceleration rate is not limited to the process described above, and another calculation method may be used. Otherwise, sensors for determining the vehicle velocity and the acceleration rate may be provided.

(c) In the embodiment described above, the lower limit of the first range R1 coincided with the second velocity V2, but may also decrease or increase in a range of 10% relative to the second velocity V2 without perfectly coinciding. A lower velocity than the second velocity V2 is preferred. The upper limit of the first range R1 coincided with the third velocity V3, but may also decrease or increase in a range of 10% relative to the third velocity V3 without perfectly coinciding. A higher velocity than the third velocity V3 is preferred. In this case, the difference between the upper limit of the first range R1 and the third velocity V3 is preferably less than the difference between the lower limit of the first range R1 and the second velocity V2. The same holds true for the upper and lower limits of the third range R3 as well as the upper and lower limits of the fifth range R5.

The work vehicle of the illustrated embodiment has the effect of making it possible to minimize the decrease in acceleration rate during sudden accelerations, and the present invention is useful as a work vehicle and a method for controlling a work vehicle.

The invention claimed is:
1. A work vehicle comprising:
an engine;
a travel wheel rotatably driven by driving force from the engine;
a power transmission mechanism configured and arranged to transmit the driving force from the engine to the travel wheel, the power transmission mechanism having a transmission and a torque converter with a lock-up clutch; and
a control unit configured to control a shift in a speed gear of the transmission according to a vehicle velocity, the control unit being configured to control a connection state of the lock-up clutch according to the vehicle velocity when the vehicle velocity is smaller than a lower limit of a predetermined first range, the control unit being configured to determine whether or not an acceleration rate of the vehicle is equal to or less than a predetermined threshold, the control unit being configured to switch the lock-up clutch from a not-connected state to a connected state upon the vehicle velocity reaching a predetermined first range when the acceleration rate of the vehicle is equal to or less than the threshold, and the control unit being configured to maintain the lock-up clutch in the not-connected state even when the vehicle velocity is within the predetermined first range when the acceleration rate of the vehicle is greater than the threshold,
wherein the control unit is configured to set a lower limit of the first range to be substantially equal to a first limit velocity, the first limit velocity being defined such that, during a state in which the speed gear of the transmission remains the same, a first driving force transmitted from the power transmission mechanism to the travel wheel when the lock-up clutch is in the not-connected state and a second driving force transmitted from the power transmission mechanism to the travel wheel when the lock-up clutch is in the connected state coincide when the vehicle velocity is the first limit velocity, and the second driving force is greater than the first driving force when the vehicle velocity exceeds the first limit velocity.

2. The work vehicle according to claim 1, wherein
the control unit is configured to set an upper limit of the first range to be substantially equal to a second limit velocity, the second limit velocity being defined such that, a first driving force transmitted from the power transmission mechanism to the travel wheel when the lock-up clutch is in the not-connected state and the transmission is in a predetermined low speed gear, and a third driving force transmitted from the power transmission mechanism to the travel wheel when the lock-up clutch is in the not-connected state and the transmission is in a high speed gear which is one step higher than the low speed gear, coincide when the vehicle velocity is the second limit velocity, and the third driving force is less than the first driving force when the vehicle velocity is less than the second limit velocity.

3. The work vehicle according to claim 2, wherein
the control unit is configured to upshift the transmission from the low speed gear to the high speed gear while maintaining the lock-up clutch in the not-connected state, when the vehicle velocity exceeds the upper limit of the first range while the lock-up clutch is in the not-connected state.

4. The work vehicle according to claim 2, wherein
the control unit is configured to maintain the lock-up clutch in the connected state while the vehicle velocity is in a second range which continues from a high speed side of the first range, when the vehicle velocity exceeds the upper limit of the first range while the lock-up clutch is in the connected state, and to switch the lock-up clutch to the not-connected state and to upshift the transmission from the low speed gear to the high speed gear, when the vehicle velocity exceeds an upper limit of the second range which is substantially equal to a third limit velocity, the third limit velocity being defined such that the third driving force and a second driving force transmitted from the power transmission mechanism to the travel wheel when the lock-up clutch is in the connected state and the transmission is in the low speed gear coincide when the vehicle velocity is the third limit velocity.

5. The work vehicle according to claim 1, wherein
the control unit is configured to switch the lock-up clutch from the not-connected state to the connected state upon determining the acceleration rate of the vehicle to be equal to or less than the threshold while the vehicle velocity is within the predetermined first range and to maintain the connected state of the lock-up clutch regardless of the acceleration rate of the vehicle while the vehicle velocity is within the predetermined first range.

6. The work vehicle according to claim 5, further comprising
an acceleration device configured and arranged to be operated by an operator to input a target rotational speed of the engine,
the control unit being configured to set the first range according to an amount by which the acceleration device is operated.

7. The work vehicle according to claim 5, wherein
the control unit is configured to set the lower limit of the first range to be substantially equal to a first limit velocity, the first limit velocity being defined such that, during a state in which the speed gear of the transmission remains the same, a first driving force transmitted from the power transmission mechanism to the travel wheel when the lock-up clutch is in the not-connected state and a second driving force transmitted from the power transmission mechanism to the travel wheel when the lock-up clutch is in the connected state coincide when the vehicle velocity is the first limit velocity, and the second driving force is greater than the first driving force when the vehicle velocity exceeds the first limit velocity.

8. The work vehicle according to claim 5, wherein
the control unit is configured to set an upper limit of the first range to be substantially equal to a second limit velocity, the second limit velocity being defined such that, a first driving force transmitted from the power transmission mechanism to the travel wheel when the lock-up clutch is in the not-connected state and the transmission is in a predetermined low speed gear, and a third driving force transmitted from the power transmission mechanism to the travel wheel when the lock-up clutch is in the not-connected state and the transmission is in a high speed gear which is one step higher than the low speed gear, coincide when the vehicle velocity is the second limit velocity, and the third driving force is less than the first driving force when the vehicle velocity is less than the second limit velocity.

9. The work vehicle according to claim 8, wherein
the control unit is configured to upshift the transmission from the low speed gear to the high speed gear while maintaining the lock-up clutch in the not-connected state, when the vehicle velocity exceeds the upper limit of the first range while the lock-up clutch is in the not-connected state.

10. The work vehicle according to claim 8, wherein
the control unit is configured to maintain the lock-up clutch in the connected state while the vehicle velocity is in a second range which continues from a high speed side of the first range, when the vehicle velocity exceeds the upper limit of the first range while the lock-up clutch is in the connected state, and to switch the lock-up clutch to the not-connected state and to upshift the transmission from the low speed gear to the high speed gear, when the vehicle velocity exceeds an upper limit of the second range which is substantially equal to a third limit velocity, the third limit velocity being defined such that the third driving force and a second driving force transmitted from the power transmission mechanism to the travel wheel when the lock-up clutch is in the connected state and the transmission is in the low speed gear coincide when the vehicle velocity is the third limit velocity.

11. The work vehicle according to claim 1, further comprising
an acceleration device configured and arranged to be operated by an operator to input a target rotational speed of the engine,
the control unit being configured to set the first range according to an amount by which the acceleration device is operated.

12. A control method for a work vehicle comprising an engine, a travel wheel rotatably driven by driving force from the engine, and a power transmission mechanism for transmitting the driving force from the engine to the travel wheel, the power transmission mechanism having a transmission and a torque converter with a lock-up clutch, the control method for the work vehicle comprising:
controlling, by a control unit, a shift in a speed gear of the transmission according to the vehicle velocity;
controlling, by the control unit, a connection state of the lock-up clutch according to the vehicle velocity when the vehicle velocity is smaller than a lower limit of a predetermined first range;
determining, by the control unit, whether or not an acceleration rate of the vehicle is equal to or less than a predetermined threshold when the vehicle velocity is within a predetermined first range;
switching, by the control unit, the lock-up clutch from a not-connected state to a connected state upon the vehicle velocity reaching the predetermined first range when the acceleration rate of the vehicle is equal to or less than the threshold; and
maintaining, by the control unit, the lock-up clutch in the not-connected state event when the vehicle velocity is within a predetermined first range when the acceleration rate of the vehicle is greater than the threshold,
wherein the control unit sets a lower limit of the first range to be substantially equal to a first limit velocity, the first limit velocity being defined such that, during a state in which the speed near of the transmission remains the same, a first driving force transmitted from the power transmission mechanism to the travel wheel when the lock-up clutch is in the not-connected state and a second driving force transmitted from the power transmission mechanism to the travel wheel when the lock-up clutch is in the connected state coincide when the vehicle velocity is the first limit velocity, and the second driving force is greater than the first driving force when the vehicle velocity exceeds the first limit velocity.

* * * * *